(12) United States Patent
Chou et al.

(10) Patent No.: US 9,615,400 B2
(45) Date of Patent: Apr. 4, 2017

(54) NETWORK APPARATUS AND NETWORK SHARING METHOD

(71) Applicants: Shang-Hua Chou, Taipei (TW); Chun-Yi Lien, Taipei (TW)

(72) Inventors: Shang-Hua Chou, Taipei (TW); Chun-Yi Lien, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 344 days.

(21) Appl. No.: 14/072,805

(22) Filed: Nov. 6, 2013

(65) Prior Publication Data

US 2014/0126564 A1 May 8, 2014

Related U.S. Application Data

(60) Provisional application No. 61/723,787, filed on Nov. 8, 2012.

(30) Foreign Application Priority Data

Aug. 16, 2013 (TW) .............................. 102129561 A

(51) Int. Cl.
*H04W 88/04* (2009.01)
(52) U.S. Cl.
CPC .................... *H04W 88/04* (2013.01)

(58) Field of Classification Search
CPC ........................................................ H04W 88/04
USPC .......................................................... 370/338
See application file for complete search history.

(56) References Cited

U.S. PATENT DOCUMENTS

2007/0147620 A1   6/2007  Zheng et al.
2007/0288607 A1*  12/2007 Hsieh ............................ 709/220

FOREIGN PATENT DOCUMENTS

| CN | 1509058 | | 6/2004 |
| TW | I315621 | | 10/2009 |
| TW | M424722 | | 3/2012 |
| TW | M431152 | * | 6/2012 |
| TW | M431512 | | 6/2012 |

* cited by examiner

*Primary Examiner* — Glenford Madamba
(74) *Attorney, Agent, or Firm* — Jianq Chyun IP Office

(57) ABSTRACT

A network apparatus and a network sharing method are provided. The network apparatus includes a connecting port that can connect to a computer directly. The network apparatus automatically captures wireless network connection information stored in the computer via the connecting port, sets up a wireless network environment, so that the network apparatus acts as an external network card and makes the computer connect to the network via the network apparatus. Meanwhile, the network apparatus acts as a wireless base station and shares the network with other computer.

8 Claims, 7 Drawing Sheets

NETWORK APPARATUS AND NETWORK SHARING METHOD

CROSS-REFERENCE TO RELATED APPLICATION

This application claims the priority benefits of U.S. provisional application Ser. No. 61/723,787, filed on Nov. 8, 2012 and TW application serial No. 102129561, filed on Aug. 16, 2013. The entirety of each of the above-mentioned patent applications are hereby incorporated by reference herein and made a part of specification.

BACKGROUND OF THE INVENTION

Field of the Invention

The disclosure relates to a network apparatus and, more particularly to an apparatus for setting a network environment and sharing a network.

Description of the Related Art

As information technology develops, various data transmission methods using between electronic devices are developed. A data transmission method between the electronic devices includes wired transmission and wireless transmission. In the wired transmission, a cable is needed for connecting the devices for data transmission. Though wireless transmission is distance un-limited and is more convenient than wired transmission, however, complicated settings is required to start the data transmission through the wireless network interface.

Additionally, recording life experiences via multimedia files, such as videos, photos, and upload these multimedia files to social networking service website to share with friends are more popular. However, operations of electronic products (such as computers, smart phones) are usually too complicated, which includes the steps of searching an access point of a wireless network, setting a password, setting an Internet Protocol (IP) address and setting a network packets redirection. Many initial wireless network setting steps are required to connect to a network. In this case, a user who is not familiar with computer operations, such as aged people and children, would feel rather inconvenient because they cannot understand operating instructions.

BRIEF SUMMARY OF THE INVENTION

A network apparatus and a network sharing method are provided, and the network apparatus is also a wireless base station to share a network, and allows other users to connect to it.

The network apparatus includes a storage unit, a wireless communication unit, a connecting port, a control unit and a network port. The connecting port is used for receiving a power and wireless network connection information. The wireless communication unit provides a wireless communication function. The control unit is coupled to the storage unit and the wireless communication unit to determine whether the network apparatus is connected to a computer when the network apparatus receives a power. If yes, the wireless network connection information of the computer is captured via the connecting port, and the wireless network connection information is stored in the storage unit. The network apparatus is connected to an external communication device according to the wireless network connection information via the wireless communication unit, and a wireless network environment is set up to share a network.

A network sharing method is also provided herein. The method comprises the steps as following: connecting a network apparatus to a computer; capturing and storing wireless network connection information of the computer and connecting to a network according to the wireless network connection information; determining whether the network apparatus is connected to a router when the network apparatus is disconnected to the computer; and connecting to the network and sharing the network according to the stored wireless network connection information if the network apparatus is not connected to the router.

These and other features, aspects and advantages of the disclosure will become better understood with regard to the following embodiments and accompanying drawings.

DETAILED DESCRIPTION OF THE EMBODIMENTS

Figure 1:
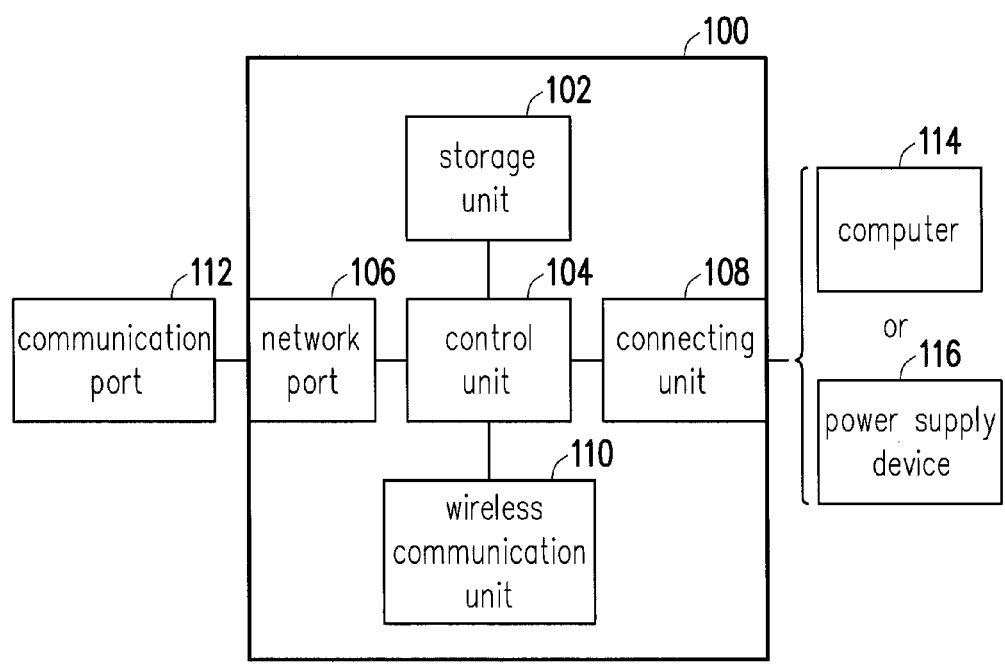
FIG. 1 is a schematic diagram showing a network apparatus in an embodiment.

FIG. 1 is a schematic diagram showing a network apparatus in an embodiment. Please refer to FIG. 1, a network apparatus 100 includes a storage unit 102, a control unit 104, a wireless communication unit 110, a network port 106 and a connecting port 108 such as universal serial bus port (USB). The control unit 104 is coupled to the storage unit 102, the network port 106, the connecting port 108 and the wireless communication unit 110. The network apparatus 100 receives power via the connecting port 108. When the network apparatus 100 is enabled while it receives a power, the control unit 104 of the network apparatus 100 automatically captures wireless network connection information in the computer 114 via the connecting port 108, and the network apparatus 100 stores the wireless network connection information in the storage unit 102 and sets up a wireless network environment according to the wireless network connection information. Thus, the network apparatus 100 becomes an external network card of the computer 114 and acts as a wireless base station simultaneously to share a network with other electronic devices. In the embodiment, the connecting port 108 of the network apparatus 100 receives power from the computer 114.

Figure 2A:
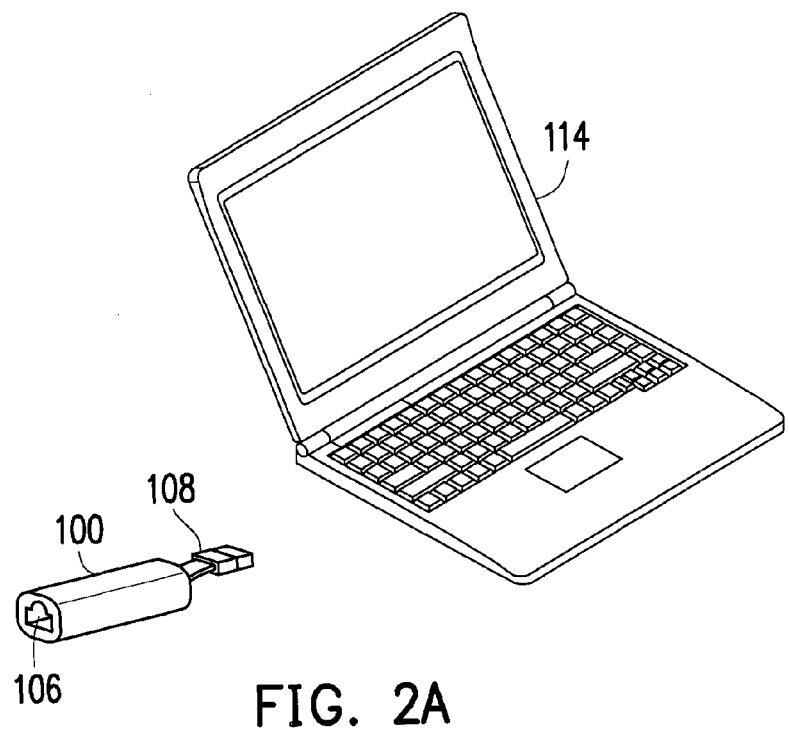
FIG. 2A is a schematic diagram showing that a network apparatus is connected to a computer in an embodiment.
Figure 2B:
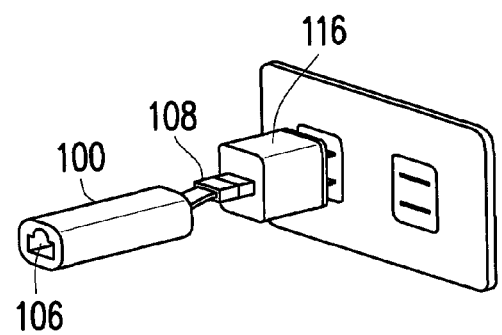
FIG. 2B to FIG. 2C are schematic diagrams showing that a network apparatus is connected to a power supply device in the embodiment.
Figure 2C:
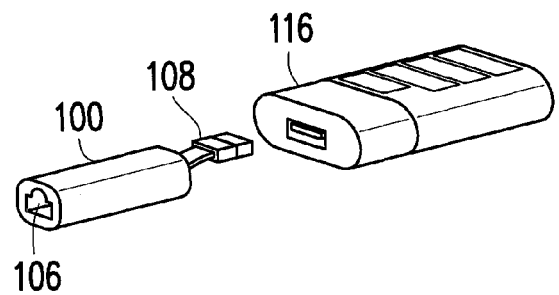

In addition, if the connecting port of the network apparatus 100 is disconnected from the computer 114, the network apparatus 100 receives power from another power supply device 116 via the connecting port 108. In an embodiment as showed in FIG. 2B and FIG. 2C, the power supply device 116 is a power adapter (FIG. 2B) or a portable power source (FIG. 2C). In this case, the network apparatus 100 has power to connect to other communication device 112 (such as a router, a IP router, or a modem) via a network port 106 (such as an Ethernet port). Meanwhile, the network apparatus 100 acts as a wireless base station by internal and shares network to other electronic devices.

Figure 3A:
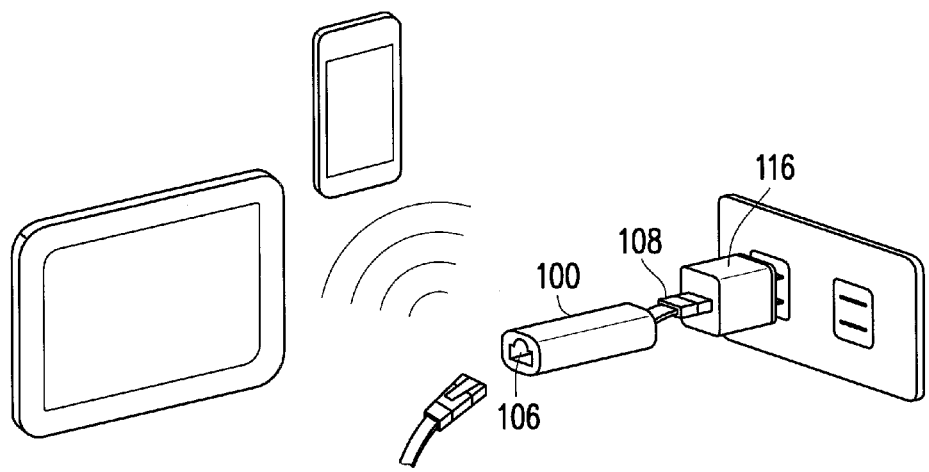
FIG. 3A to FIG. 3B are schematic diagrams showing that a network apparatus shares a network in an embodiment.
Figure 3B:
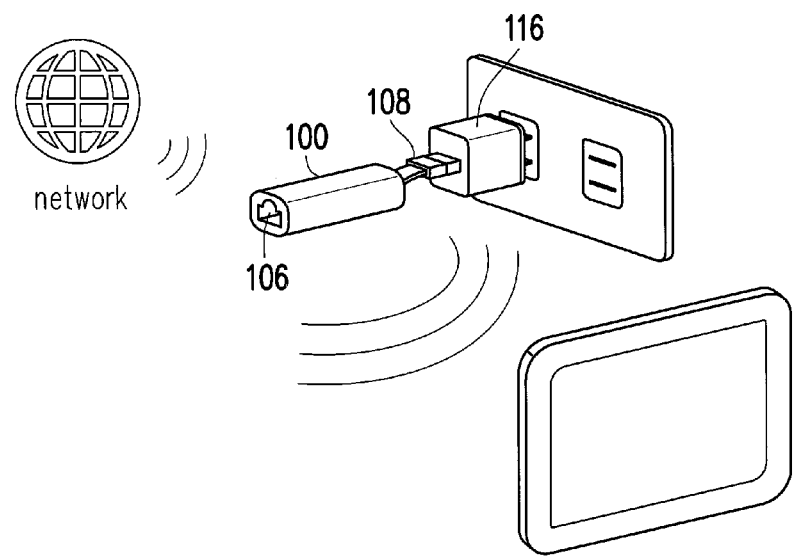

In an embodiment as showed in FIG. 3A, which is a schematic diagram showing that the network apparatus shares network without connecting to the computer. The network apparatus 100 receives power from the power supply device 116 (an adaptor) via the connecting port 108 and a physical cable providing network from other network apparatus is connected via the network port 106. Meanwhile, the network apparatus 100 shares the network from other network apparatus to other electronic devices, such as mobile phones or tablet computers. As shown in FIG. 3B, if the network connection via the network port 106 disabled (disconnected), the network apparatus 100 searches surrounding routers via the internal wireless communication unit 110 to join the network and shares the network with other electronic devices.

In detail, a network sharing application to enable the network apparatus 100 is stored in the storage unit 102 of the network apparatus 100. When the connecting port 108 of the network apparatus 100 is connected to the computer 114, the control unit 104 installs the network sharing application to the computer 114, and thus the network apparatus 100 is enabled by the computer 114, than the wireless network connection information of the computer 114 is captured. The wireless network connection information includes a service set identifier (SSID) of a router, a password corresponding to the SSID and an encryption protocol, and the encryption protocol may be a wireless networking protected access (WPA), a temporal key integrity protocol (TKIP), an advanced encryption standard (AES), etc.

If the network apparatus 100 is not connected to the computer 114, the control unit 104 connects to the network according to the wireless network connection information previously stored in the storage unit 102, and the wireless network environment is set up and the network is shared with other electronic devices. In an embodiment, power for enable the network apparatus 100 can be provided by other power supply devices, such as a power adapter, a portable power source, and other power supply ports of the computer. As a result, the control unit 104 of the network apparatus 100 connects to the network directly according to the wireless network connection information stored in the storage unit 102, and the wireless network environment is set up and the network is shared with other electronic devices, rather to capture the wireless network connection information of the computer 114.

Furthermore, to connect to the network according to the wireless network connection information stored in the storage unit 102, searches are repeatedly executed, to find out surrounding routers that have consistent information with the wireless network connection information stored in the storage unit 102 of the network apparatus 100. Once the router with consistent information with the wireless network connection information is found, the control unit 104 of the network apparatus 100 connects to network via the router.

Additionally, when the control unit 104 sets up the wireless network environment and shares the network, security control settings of the network apparatus 100 are utilized to set security information while the network apparatus 100 is connected. In an embodiment, a media access control address (MAC address) of the computer 114 and an individual digital identifier code are set to automatically generate a SSID and a password corresponding to the SSID. To connect to the network apparatus 100 or other electronic devices, such as mobile phones, tablet computers, or laptops, can send a request to the network apparatus 100 for joining the network according to the SSID and the password. Thus, users only needs to connect the network apparatus 100 to a device, and the wireless network environment is automatically setting up without manually setting a MAC address, a SSID, or a password through firmware of the computer 114. Consequently, a plurality of setting steps can be omitted, and it is much more convenient in using the network. Moreover, one account is usually only for one device in a conventional paid wireless service. In the disclosure, since the network apparatus 100 can automatically generate a SSID and a password corresponding to the SSID to share the network, the network apparatus 100 shares one account to a plurality of different electronic devices.

Figure 4:
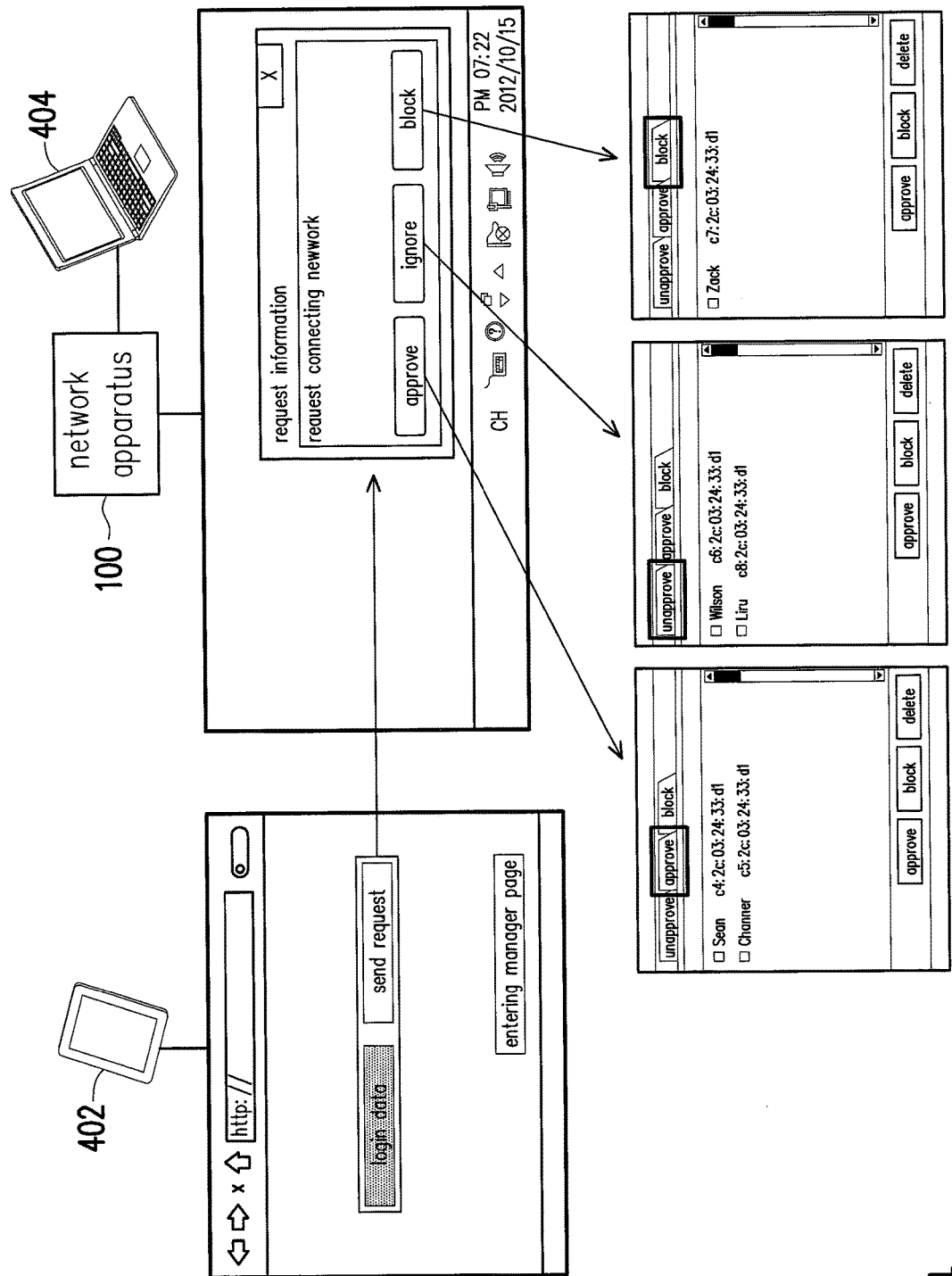
FIG. 4 is a schematic diagram showing that a network apparatus shares a network in another embodiment.

A network permission setting interface provided by the network sharing application is showed on the computer 114 for setting network permission when the control unit 104 receives a network joining request from an network requesting device 402. FIG. 4 is a schematic diagram showing that the network apparatus shares the network in an embodiment. As shown in FIG. 4, when the network requesting device 402 (shown as a tablet computer in the embodiment, which is not limited herein) sends a network joining request to the network apparatus 100 via a SSID and a password generated by the control unit 104, the network apparatus 100 asks the network requesting device 402 to fill in login data. As shown in FIG. 4, only a login name at the interface of the network requesting device 402 is input and send it out, the network joining request is issued. While receiving the login data and the network joining request, the network apparatus 100 informs the computer 404 network requesting device 402. In some embodiments, the network apparatus 100 allows the network requesting device 402 by its original device name instead of requiring the network requesting device 402 to fill in the login data. The network permission is showed on the network permission setting interface for the network requesting device 402 to select when the computer 404 receives the request. Additionally, an interface of the network requesting device 402 can also show an option for entering a manager page, which facilitates the manager setting the related network connections via the network requesting device 402.

As shown in FIG. 4, the network permission setting interface shows the name of the network requesting device 402 which asks for sharing the network (such as "sean" is the name of the network requesting device 402 in the embodiment) and options of the network permission, such as "approve", "ignore" or "block", the user only needs to select the corresponding option, and the control unit 104 determines whether to share the network according to the response of the computer 404 (that is the selected option). Moreover, the list of the devices is showed for setting the network permission (such as "approve", "ignore" and "block") for further confirm the permission. As stated above, the user can decide whether to share the network with the network requesting device 402 in a simple way, rather than by setting an IP address, a MAC address of the network requesting device 402 through the firmware of the computer 404, which brings great convenience in using the network.

Figure 5:
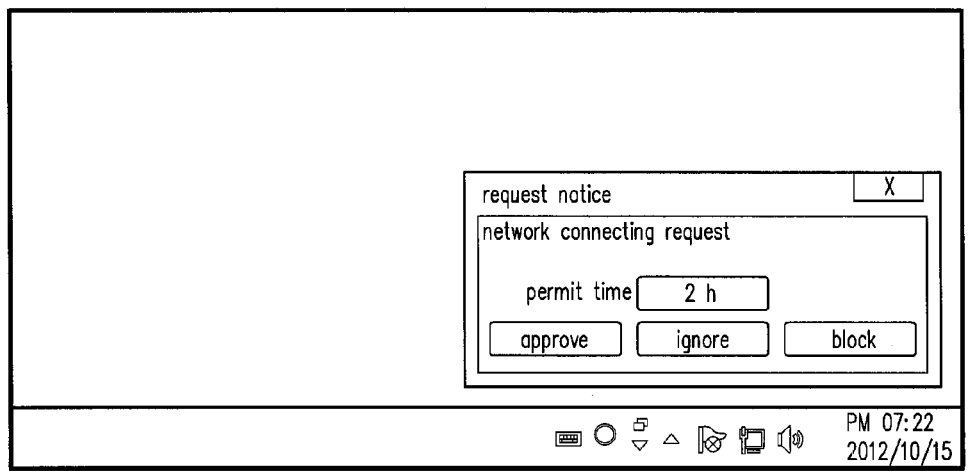
FIG. 5 is a schematic diagram showing a network permission setting interface in an embodiment.

FIG. 5 is a schematic diagram showing a network permission setting interface in an embodiment. The network permission setting interface also includes a menu for setting the network permitting time of the network requesting device 402. If the network permitting time (2 hours in the embodiment, which is not limited herein) is up, the network sharing with the network requesting device 402 is stopped, which makes the setting of the network permission more flexible.

The network permission setting interface allows the user to set passwords with different permissions. In an embodiment, a password presents with a permission of sharing the network directly. The control unit 104 determines whether to share the network with the network requesting device 402 directly according to the password from the network requesting device 402 which sends the network joining request. If the password from the network requesting device 402 does not have permission to use the network directly, the control unit 104 still needs to determine whether to share the network according to the response of the computer 404. If the password from the network requesting device 402 has the permission to use the network directly, the control unit 104 can share the network with the network requesting device 402 directly without the approval of the computer 404.

In addition, the network apparatus 100 can be connected to the network according to the wireless network connection information stored in the storage unit 102 when the network apparatus 100 is connected to a power supply device (such as a power adapter, a portable power source or other computers) rather than connected to the computer 404. In some embodiments, when the computer 404 within the wireless network connection information is powered on, the network apparatus 100 determines whether to share the network according to the response of the computer 404. However, if the computer 404 is powered off, the computer 404 cannot inform the network apparatus 100 whether to share the network, but if the network requesting device 402 has the permission to use the network by a password, the control unit 104 can share the network with the network requesting device 402 without the approval of the computer 404. Therefore, the network requesting device 402 can get the network shared by the network apparatus 100 even when the computer 404 is powered off.

Figure 6:
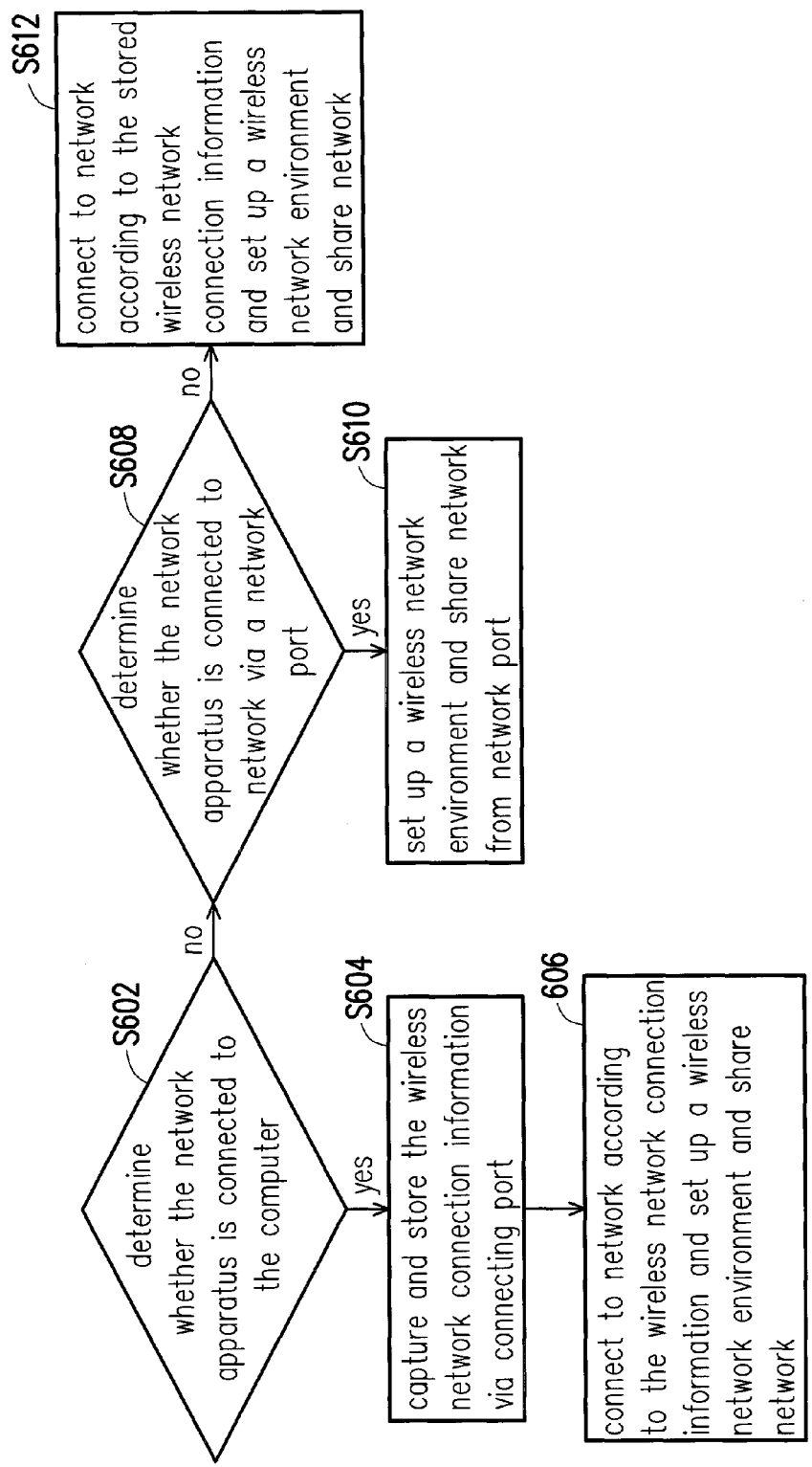
FIG. 6 is a flow chart showing a network sharing method in an embodiment.

FIG. 6 is a flow chart showing a network sharing method in an embodiment. Please refer to FIG. 6, a network sharing method of the network apparatus 100 includes the following steps. When the network apparatus receives a power, whether the network apparatus is connected to a computer is determined (step S602), and the power can provided by a power adapter, a portable power source or a computer, which is not limited herein. If the network apparatus is connected to the computer, the wireless network connection information of the computer is captured and stored via the connecting port (step S604), and the network apparatus is connected to the network according to the stored wireless network connection information, and a wireless network environment is set up to share the network (step S606). If the network apparatus is not connected to the computer, whether the network apparatus is connected to the network via the network port is determined (step S608). If the network apparatus is connected to the network via the network port, the wireless network environment is set up to share the network from the network port. Conversely, if the network apparatus is not connected to the network via the network port, the network apparatus is connected to the network directly according to the stored wireless network connection information and the wireless network environment is set up to share the network (step S612). The wireless network connection information includes a SSID of a router, a password corresponding to the SSID and an encryption protocol, and the encryption protocol may be a WPA, a TKIP, an AES, which is not limited herein.

Figure 7:
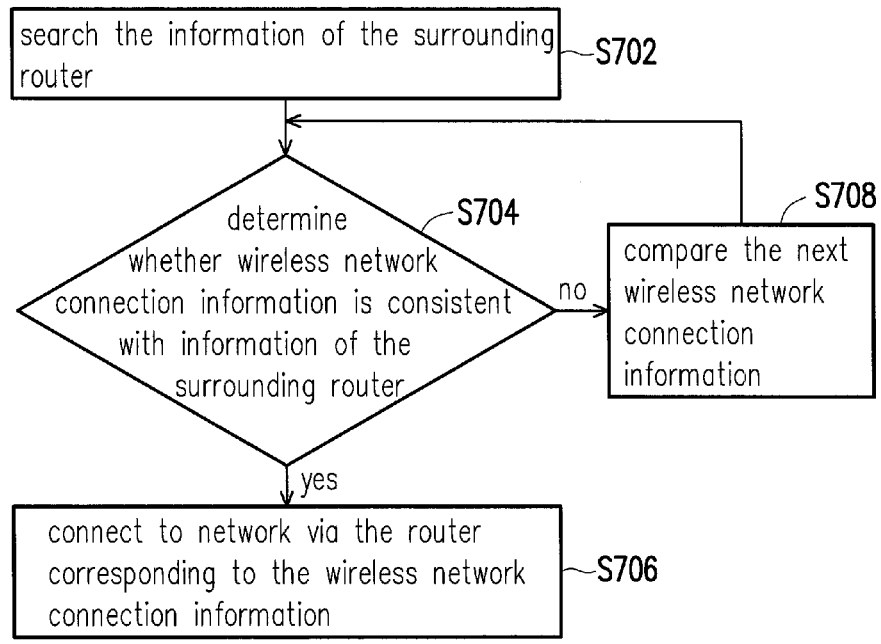
FIG. 7 is a flow chart showing a method of connecting to a network according to a wireless network connection information in an embodiment.

FIG. 7 is a flow chart showing a method of connecting to the network according to the wireless network connection information in an embodiment. In detail, a method of the network apparatus 100 connecting to the network via the wireless communication unit 110 according to the stored wireless network connection information includes the following steps. First, information of the surrounding routers is searched (step S702). Then, whether the wireless network connection information is consistent with the information of the surrounding routers is determined (step S704), if yes, the network apparatus is connected to the network via the router corresponding to the wireless network connection information (step S706). Conversely, if not, the next wireless network connection information and the information of the router are compared (step S708), and step S704 is performed again to determine whether the wireless network connection information is consistent with the information of the surrounding routers.

Figure 8:
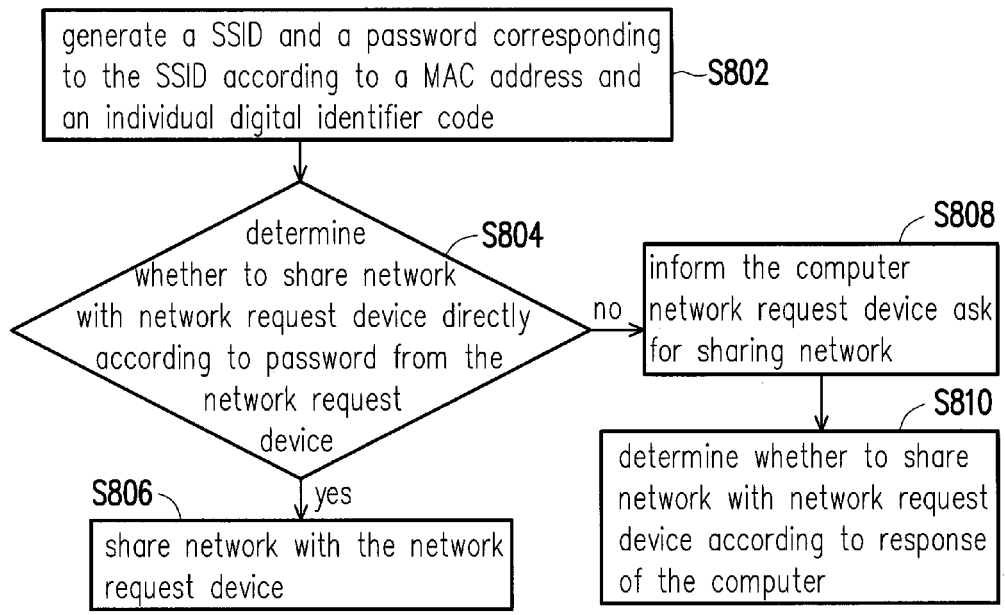
FIG. 8 is a flow chart showing a method of setting up a wireless network environment and sharing a network in an embodiment.

FIG. 8 is a flow chart showing a method of setting a wireless network environment and sharing a network in an embodiment. In detail, the method includes the following steps. First, a SSID and a password corresponding to the SSID are generated according to a MAC address of the computer and an individual digital identifier code (step S802). Then, whether to share the network with the network request device directly is determined according to the password used by the network request device which sends the network joining request (step S804). If the password used by the network request device has permission to join the network, the network is shared directly (step S806). If the password used by the network request device does not have permission, the network request device requires for sharing the network is informed to the computer (step S808), in this case, the computer shows the network permission setting interface for the user setting network permission. Then, whether to share the network with the network request device is determined according to the response of the computer (step S810).

In conclusion, when the network apparatus is connected to the connecting port of the computer, the wireless network connection information is automatically captured and stored via the connecting port, the network apparatus is connected to network, and the wireless network environment is set up to share the network, and thus a plurality of setting steps can be omitted, which brings great convenience in network joining.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A network apparatus, adapted to connect to a router, comprising:
 a network port;
 a connecting port for receiving a power, and automatically capturing and storing wireless network connection information that is stored in a computer;
 a storage unit;

a wireless communication unit providing a wireless communication function; and a control unit coupled to the storage unit and the wireless communication unit, and determining whether the network apparatus is connected to the computer when the network apparatus receives the power, the control unit searching information of a surrounding router, determining whether the wireless network connection information is consistent with the information of the surrounding router and connecting to the network via the router corresponding to the wireless network connection information if the wireless network connection information is consistent with the information of the surrounding router, the control unit determining whether the network apparatus is connected to the network via a network port, setting up a wireless network environment and sharing the network if the network apparatus is connected to the network via the network port, wherein the network port is an Ethernet port, the control unit determining whether the network apparatus is connected to a router when the network apparatus is disconnected to the computer, connecting to the network and sharing the network according to the stored wireless network connection information if the network apparatus is not connected to the router and is not connected to the network via a network port, wherein if the network apparatus is connected to the computer, the wireless network connection information of the computer is captured by the network apparatus via the connecting port, and the wireless network connection information is stored in the storage unit, and a wireless network environment is set up for network sharing, wherein when the control unit receives a network connecting request, a network permission setting interface is showed on the computer which includes user permissions, router information, a SSID, a password corresponding to the SSID, an encryption protocol with a wireless networking protected access (WPA), a temporal key integrity protocol (TKIP), or an advanced encryption standard (AES).

2. The network apparatus according to claim 1, wherein if the network apparatus is not connected to the computer but receives the power, the control unit is connected to the network according to the wireless network connection information stored in the storage unit, and a wireless network environment is set up for network sharing.

3. The network apparatus according to claim 1, wherein the power is provided by an adaptor, a portable power supply or the computer.

4. The network apparatus according to claim 1, wherein the network port is an Ethernet port.

5. The network apparatus according to claim 1, wherein the control unit generates a service set identifier (SSID) and a password corresponding to the SSID according to a media access control address (MAC address) of the computer and an individual digital identifier code.

6. A network sharing method, adapted for connecting to a router, comprising:

connecting a network apparatus to a computer;

automatically capturing and storing wireless network connection information stored in the computer by using the network apparatus and connecting to a network according to the wireless network connection information, wherein connecting to the network according to the wireless network connection information includes:
    searching information of a surrounding router;
    determining whether the wireless network connection information is consistent with the information of the surrounding router; and
    connecting to the network via the router corresponding to the wireless network connection information if the wireless network connection information is consistent with the information of the surrounding router;

determining whether the network apparatus is connected to the network via a network port;

setting up a wireless network environment and sharing the network if the network apparatus is connected to the network via the network port, wherein the network port is an Ethernet port;

determining whether the network apparatus is connected to a router when the network apparatus is disconnected to the computer; and connecting to the network and sharing the network according to the stored wireless network connection information if the network apparatus is not connected to the router and is not connected to the network via a network port, wherein the wireless network connection information includes a SSID of the router, a password corresponding to the SSID, an encryption protocol includes a WPA, a TKIP and an AES.

7. The network sharing method according to claim 6, wherein the power is provided by an adaptor, a portable power supply or the computer.

8. The network sharing method according to claim 6, wherein the network sharing method includes the following steps:

generating a SSID and a password corresponding to the SSID according to a MAC address of the computer and an individual digital identifier code; and showing a network permission setting interface when a network connecting request is received.

\* \* \* \* \*